April 8, 1969     D. P. SIMONTON     3,436,988
ADJUSTABLE CRANK MECHANISM
Filed Jan. 18, 1968
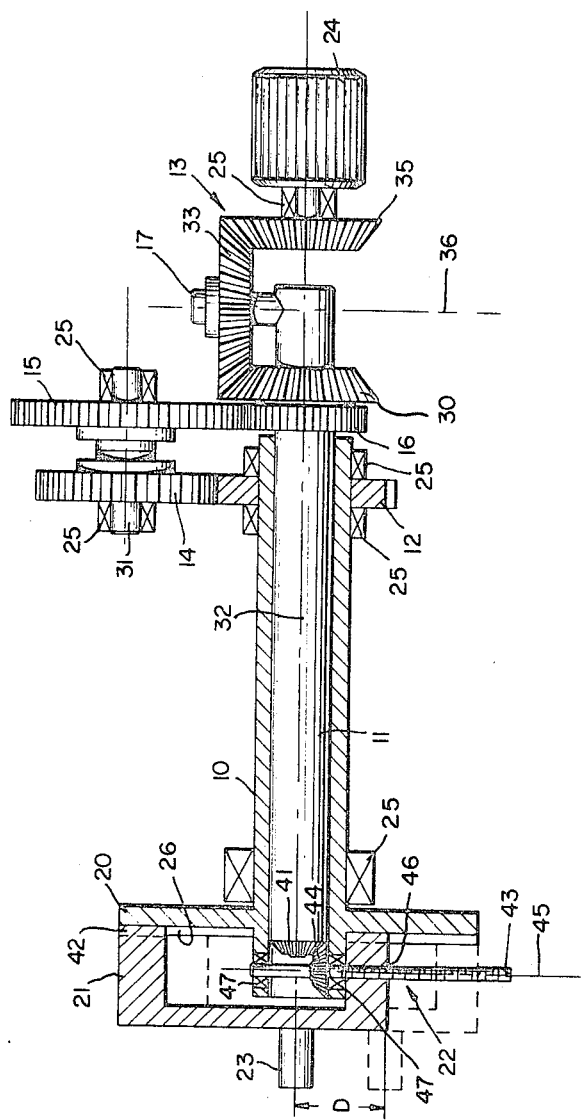
David P. Simonton,
INVENTOR.
BY.
*Frank Wattles*
ATTORNEY.

United States Patent Office 3,436,988
Patented Apr. 8, 1969

3,436,988
ADJUSTABLE CRANK MECHANISM
David P. Simonton, El Segundo, Calif., assignor to TRW Inc., Redondo Beach, Calif., a corporation of Ohio
Filed Jan. 18, 1968, Ser. No. 698,845
Int. Cl. F16h 35/08; G05g 1/00
U.S. Cl. 74—837
10 Claims

ABSTRACT OF THE DISCLOSURE

A crank mechanism having a crank pin capable of being displaced radially relative to its center of rotation while stationary or during operation of the crank. The crank mechanism has an inner shaft which operates concentrically within an outer shaft, a drive gear which turns the outer shaft, a gear train which drives a differential gear at two times the speed of the outer shaft, a radial gear shaft connecting the differential spider gear to the inner shaft to rotate the inner shaft in normal mode at the same speed and direction as the outer shaft, and a control knob connected to the differential gear for varying the differential output rotational speed and consequently the relative speeds of the inner and outer shaft. At the end of the shafts opposite the differential gear is located a crank pin mounted on a radially movable block. A radially oriented jackscrew is geared to the end of the inner shaft and mounted in bearings in the outer shaft so that the jackscrew and block will rotate normally about the common axis of the inner and outer shafts, and in addition the jackscrew will rotate about its own axis only when there is a difference in rotational speed between the inner and outer shafts. Rotation of the jackscrew, about its axis, radially displaces the crank pin and movable block which engages the jackscrew. Rotation of the knob adds to or subtracts from the relative rotation of the inner shaft by changing the differential input, and consequently the crank pin is displaced by the resulting rotation of the jackscrew.

BACKGROUND OF THE INVENTION

Field of the invention

An adjustable crank mechanism and particularly a crank mechanism having concentric rotating shafts providing continuous adjustment of amplitude or "throw" of a crank pin while the crank is stationary or in motion.

Description of the prior art

A conventional crank-driven reciprocator (as might be used in a radar antenna simulator) consists of a crank-pin locked to a simple crank-frame. To adjust the amplitude, the mechanism must be stopped, the pin-frame unlocked and moved relative to the crank-frame and relocked, and the mechanism restarted. Illustrative of disadvantages inherent in the stopped-adjustment technique are loss of time, inability to produce amplitudes which continuously vary, and inability to make the amplitude setting relative to a desired output point.

This invention avoids the disadvantages of conventional crank mechanisms by providing means for continuous adjustment of the amplitude or "throw" of the crank pin while the crank mechanism is in operation or stationary. Patented crank mechanisms which provide for amplitude adjustment during operation of the crank utilize different structures, not relying upon the difference in relative motion of two or more rotating shafts to activate and adjustment mechanism for shifting the position of the crank pin. Three such patents are: 3,242,768, Adjustable Crank Mechanism; 3,269,220, Driving Arrangement for Oscillating Movement of the Shear Frame of Flying Shears for Continuously Moving Rolling Stock; 2,319,485, Mechanical Movement.

This invention improves upon the prior art by providing a continuously adjustable amplitude or "throw" of a crank pin in a crank mechanism during operation, utilizing the difference in rotation speed of two shafts to activate an adjustment mechanism for shifting the position of the crank pin.

SUMMARY OF THE INVENTION

Briefly, this invention provides a continuously adjustable crank mechanism wherein the amplitude or "throw" of the crank pin may be adjusted while the crank is in motion or stationary. The crank mechanism comprises a first rotatable member and a second rotatable member. Both the first and second members are carried in a bearing frame. Driving means are mounted on the first member for rotating the first member. Second member rotation means are provided connecting the driving means with the second member for normally rotating the second member at a speed equal to the rotation speed of the first shaft. Control means are carried by the second member rotation means for varying the rotation speed of the second member. A frame is carried by the first member and a crank pin mounting means is carried on the frame and movable radially with respect to the axis of the first member. A crank pin is mounted on the crank pin mounting means. Means are provided connecting the second member with the crank pin mounting means and frame for detecting differences in rotation speed of the second member relative to the first member, and for proportionately displacing the crank pin mounting means.

In accordance with one phase of this invention the continuously adjustable crank mechanism is as described above and additionally the first member forms a first shaft having a longitudinal bore to receive the second shaft therein and the second shaft is located within the longitudinal bore. The axis of the second shaft is coincident with the axis of the first shaft.

BRIEF DESCRIPTION OF THE DRAWINGS

In the drawings:
The figure is a partially sectioned elevation view of one embodiment of the crank mechanism.

DESCRIPTION OF THE EMBODIMENT

Referring now to the drawings, there is shown a preferred embodiment of the adjustable crank mechanism. The adjustable crank mechanism includes a first shaft 10, a second shaft 11 concentrically located with shaft 10, a driving gear 12 to receive external power and rotate shaft 10, a differential gear 13 at one end of shaft 11, gears 14, 15, and 16 connecting shaft 10 with gear 13 to cause gear 13 at one end to rotate at twice the speed of shaft 10, a spider gear shaft 17 connecting gear 13 with shaft 11 to turn shaft 11 at the rate of the differential gear output speed which is normally equal to the speed of shaft 10, a frame 20 fixed at one end of shaft 10, block 21 carried on frame 10 and movable radially with respect to shaft 10, jackscrew 22 geared at one end of shaft 11 and mounted in fixed relation to shaft 10 and frame 20, crank pin 23 located on block 21 to also be radially displaced from shafts 10 and 11, control knob 24 integral with one end of gear 13, and bearing frame 25 within which the mechanism is supported.

Shaft 11 fits into a longitudinal bore of shaft 10 and is free to turn concentrically therein. Normally shaft 11 rotates in the same direction and at the same speed as shaft 10. This invention contemplates alternative configurations within which two shafts or members each rotate at varying speeds, the rotation speeds to be compared in a crank mechanism. The two shafts or members may be located external to each other. Also the two shafts or members may be in any physical shape to form not shafts, but members.

"Normally" as used herein refers to conditions instant in the crank mechanism when the mechanism is in operation and there is no adjustment input at knob 24.

Driving means exemplified by driving gear 12 is fixedly mounted at one end of shaft 10 so that the rotation axis of gear 12 is coincident with the axis 32 of shaft 10. Gear 12 is driven by an external power source which rotates gear 12 and simultaneously rotates shaft 10 at the same speed and in the same direction. Means for rotating shaft 11 at a normal rotation speed equal to the rotation speed of shaft 10 are provided. One such means is illustrated in the drawing to include a differential gear 13 located at one end of shaft 11, three interconnecting spur gears 14, 15, and 16 combining with gear 12 to form a backgear set, and a spider gear shaft 17. Differential gear 13 includes two crown gears 30 and 35 and a spider gear 33. The spider shaft 17 connects spider gear 33 to shaft 11. Three interconnecting gears 14, 15, and 16 provide connections between gear 12 and differential gear 13 in order that gear 30 of the differential gear 13 will rotate at two times the speed of shaft 10 and in the same direction as shaft 10. Gear 14 engages and is directly driven by gear 12 and is located upon shaft 31 with gear 15, so that both gears 14 and 15 rotate at the same speed and in the same direction. Gear 16 is joined to gear 30. Gear 16 is driven by gear 15 and in turn drives gear 30 at the same rotation speed as gear 16. The ratio of the diameters of gears 12, 14, 15, and 16 are related so as to cause gearrs 16 and 30 to rotate at twice the speed of gear 12 and shaft 10. The axis of shaft 31 is supported by bearing frame 25, and is parallel to, but does not rotate about, axis 32. Gears 30 and 33 in combination revolve about axis 32. Gear 33 normally rotates about axis 36 and about axis 32 simultaneously. Gear 35 normally does not rotate about axis 32 being locked in a stationary position and gear 33 turns upon gear 35. Gear shaft 17 extends through gear 33 allowing rotation about axis 36; shaft 17 rotating with gear 33 about axis 32 at a rotation speed equal to the average of the rotation speeds of gear 30 and gear 35. A bearing or other friction reducing means may be located between shaft 17 and gear 33 to provide support and reduce wear upon the parts. Because gear 30 has a normal rotation speed equal to twice the rotation speed of shaft 10 and because gear 35 is stationary, the average rotation speed of the two gears results in the rotation speed of the shaft 17 about axis 32 being normally the same speed as shaft 10. Shaft 17 is fixed to shaft 11 so that shaft 11 rotates about axis 32 at the same rate that shaft 17 rotates about axis 32.

Crank pin 23 is located at the end of shafts 10 and 11 opposite differential gear 13. Pin 23 is mounted on a movable block 21 which is carried by frame 20. Means are provided to connect shaft 11 with block 21 for detecting differences in rotation speed of shafts 10 and 11, which means also proportionately displaces block 21 and pin 23. This means for detecting differences in rotation speed of shafts 10 and 11 is exemplified in the drawing as jackscrew 22 having a screw shaft 43 and jackscrew gear 44. Frame 20 is mounted upon one end of shaft 10 and fixed to shaft 10. Block 21 is movably mounted on frame 20 to allow radial displacement of block 21 upon frame 20 along the dovetail guide 42 of block 21 within the dovetail guide channel 26 in frame 20, or any other guide means. The end of shaft 11 adjacent to jackscrew 22 is in the form of gear 41. Jackscrew 22 is supported in block 21 by screw shaft 43 which extends through one end of block 21, shaft 43 having threads complementary with a threaded aperture 46 in block 21. Also, shaft 43 is supported in bearings 47 in frame 20. Jackscrew gear 44 engages but normally does not turn upon gear 41. Jackscrew 22, block 21, frame 20, and gear 41 all rotate about axis 32, each such element normally having no relative motion therebetween. Crank pin 23 which is mounted upon block 21 may transmit amplitude or "throw" to externally connected equipment proportional to the amount of displacement of pin 23 from the axis of rotation 32, noted as "D" in the drawing.

A knob 24 is provided at one end of the crank mechanism adjacent to differential gear 13. Knob 24 is integral with gear 35 and normally has zero rotational speed, as does gear 35. By unlocking and turning knob 24, gear 35 is rotated about axis 32. Simultaneously the average of the rotation speeds of gears 30 and 35 is varied, thereby varying the rotation rate of gear shaft 17 and shaft 11. Under this condition of adjustment, herein referred to as the adjustment mode, shaft 11 will not rotate at the same speed as shaft 10. The difference in rotational speed will be detected at jackscrew gear 44 and gear 44 will be rotated by gear 41 about axis 45 of screw shaft 43. Rotation of gear 44 about axis 45 will turn shaft 43, thereby increasing or decreasing the radial displacement of block 21 and pin 23. Accordingly, rotation of knob 24 will radially displace crank pin 23, and it is apparent that during crank operation or while the crank mechanism is stopped, displacement of pin 23 can be effected continuously by continuously varying the position of knob 24.

Alternative to manual rotation of gear 35 by means of an adjustment knob 24, any known control means can be employed. For example, a continuously generated electrical input function can be applied to a transducer which will sense the electrical input signal, convert the signal into mechanical energy and transmit the input to gear 35 to effect appropriate rotation and displacement of pin 23.

While certain embodiments of the invention, such as the location of a smaller rotatable shaft within a larger rotatable shaft, have been described in detail herein and shown in the accompanying drawing, it will be evident that various additional modifications are possible in the arrangement and construction of its components without departing from the scope of the invention.

I claim:
1. A continuously adjustable crank mechanism comprising:
   a first rotatable member,
   a second rotatable member, said first and second members carried in a bearing frame,
   driving means mounted on said first member for rotating said first member,
   second member rotation means connecting said driving means with said second member for normally rotating said second member at a speed equal to the rotation speed of the first member,
   control means carried by said second member rotation means for varying the rotation speed of said second member,
   a frame carried by said first member,
   crank pin mounting means carried by said frame and movable radially with respect to the axis of said first member,
   a crank pin mounted on said crank pin mounting means, and
   means connecting said second member with said crank pin mounting means and frame for detecting differences in rotation speed of the second member relative to the first member and for proportionately displacing the crank pin mounting means.

2. A continuously adjustable crank mechanism as in claim 1 wherein each said member forms a shaft.

3. A continuously adjustable crank mechanism as in claim 2 wherein:
   the first shaft has at least one aperture to support the second shaft therein, and the second shaft is supported within said at least one aperture of said first shaft.

4. A continuously adjustable crank mechanism as in claim 3 wherein:
the first shaft has a longitudinal bore to receive the second shaft therein, and
the second shaft locates within said longitudinal bore having axis coincident with said first shaft.

5. A continuously adjustable crank mechanism as in claim 4 wherein the second shaft rotation means includes:
a differential gear located at one end of said second shaft,
means connecting said driving means with said differential gear for rotating said differential gear at a normal output rotation speed equal to the rotation speed of said first shaft, and
means connecting said differential gear with said second shaft for rotating the second shaft at a normal speed equal to the output speed of said differential gear.

6. A continuously adjustable crank mechanism as in claim 3 wherein:
the driving means defines a gear adapted to be driven by an external power source, and
the means connecting the driving means with said differential gear defines at least three interconnected gears, one of the interconnected gears mounted fixedly upon the differential gear and adapted to rotate at two times the speed of said first shaft.

7. A continuously adjustable crank mechanism as in claim 6 wherein the means connecting said differential gear with said second shaft defines a spider gear shaft integral with one end of thesecond shaft, the axis of the spider gear being perpendicular to the axis of the second shaft.

8. A continuously adjustable crank mechanism as in claim 7 wherein:
the frame is fixed to the end of said first shaft opposite said differential gear, said frame rotatable about the axis of the first shaft,
the means connecting said second shaft with said crank pin mounting means and frame defines a jackscrew adapted to displace said crank pin and crank pin mounting means radially with respect to the axis of the first shaft, said jackscrew including a screw shaft and a gear mounted on said screw shaft adjacent said second shaft,
the crank pin mounting means defines a block having internal threaded aperture adapted to receive therethrough the threaded jackscrew shaft and to be displaced upon the jackscrew shaft in a direction radial to the common axes of the first and second shafts, and
the end of the second shaft adjacent said jackscrew gear defines a complementary gear, said second shaft gear adapted to engage the jackscrew gear, the latter gear to rotate upon the former gear and about the axis of the jackscrew shaft only upon a rotation of the first shaft relative to the second shaft, said rotation of the jackscrew gear and jackscrew shaft radially displacing the block and crank pin thereon.

9. A continuously adjustable crank mechanism as in claim 8 wherein the control means defines a rotatable knob directly connected to the element of the differential gear normally having zero rotation speed and opposite the element of the differential gear having one interconnected gear mounted thereon and a rotation speed two times the speed of the first shaft, said knob manually rotatable to effect a relative rotation motion between said first and second shafts.

10. A continuously adjustable crank mechanism as in claim 6 wherein the control means includes:
a sensor adapted to receive a continuously generated input, and
a transmitter responsive to said input and adapted to effect a relative rotation motion between said first and second shafts in proportion to said input.

References Cited

UNITED STATES PATENTS

| | | | |
|---|---|---|---|
| 712,674 | 11/1902 | Harris | 74—837 |
| 951,055 | 3/1910 | Clark | 74—665 |
| 2,319,485 | 5/1943 | Alabrune | 74—600 |
| 2,730,345 | 1/1956 | Sloane | 74—600 |
| 3,090,250 | 5/1963 | Budlong | 74—600 |
| 3,242,768 | 3/1966 | Munschauer. | |
| 3,269,220 | 8/1966 | Waldura et al. | |

FRED C. MATTERN, JR., *Primary Examiner.*

W. S. RATLIFF, JR., *Assistant Examiner.*

U.S. Cl. X.R.

74—600, 665